US012085504B2

(12) United States Patent
Li et al.

(10) Patent No.: US 12,085,504 B2
(45) Date of Patent: Sep. 10, 2024

(54) EXTRAORDINARY IR-ABSORPTION IN SiO₂ THIN FILMS WITH A FOREIGN OR ATTENUATING MATERIAL APPLIED

(71) Applicant: Halliburton Energy Services, Inc., Houston, TX (US)

(72) Inventors: Jian Li, Bellaire, TX (US); Jimmy Price, Cypress, TX (US); Bin Dai, Spring, TX (US); Christopher Michael Jones, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 914 days.

(21) Appl. No.: 16/973,279

(22) PCT Filed: Jul. 18, 2018

(86) PCT No.: PCT/US2018/042728
§ 371 (c)(1),
(2) Date: Dec. 8, 2020

(87) PCT Pub. No.: WO2020/018092
PCT Pub. Date: Jan. 23, 2020

(65) Prior Publication Data
US 2021/0247303 A1  Aug. 12, 2021

(51) Int. Cl.
*G01N 21/3577* (2014.01)
*E21B 49/08* (2006.01)
(Continued)

(52) U.S. Cl.
CPC .......... *G01N 21/3577* (2013.01); *G01J 3/12* (2013.01); *G02B 5/208* (2013.01); *G02B 5/226* (2013.01);
(Continued)

(58) Field of Classification Search
CPC ........ G01N 21/3577; G01N 2201/0686; G01J 3/12; G01J 2003/1213; G01J 2003/1226; G02B 5/208; G02B 5/226; E21B 49/0875
(Continued)

(56) References Cited

U.S. PATENT DOCUMENTS

| 2004/0080725 A1* | 4/2004 | Kaminsky ............ G03B 21/132 |
| | | 353/120 |
| 2009/0033933 A1 | 2/2009 | Myrick et al. |

(Continued)

FOREIGN PATENT DOCUMENTS

| WO | 2014/035823 A1 | 3/2014 |
| WO | 2016/032437 A1 | 3/2016 |
| WO | 2017/039675 A1 | 3/2017 |

OTHER PUBLICATIONS

Elbashar, Y. H., M. M. Rashad, and D. A. Rayan. "Protection glass eyewear against a YAG laser based on a bandpass absorption filter." Silicon 9.1 (2017): 111-116.
(Continued)

*Primary Examiner* — Md M Rahman
(74) *Attorney, Agent, or Firm* — Conley Rose, P.C.; Rodney B. Carroll

(57) ABSTRACT

An optical element may be fabricated by applying foreign or attenuating material, for example, a copper material or a material that includes copper, to a silicon dioxide thin film to form a layer that exhibits extraordinary optical absorption in the infrared wavelength region of at or about 2500-4700 nanometers. The foreign material may comprise or include a transition metal. The optical element exhibits increased accuracy and sensitivity in the infrared wavelength region of at or about 2500-4700 nanometers. The at or about 2500-4700 nanometers absorption property of the optical element can be selectively tuned to any region within this at or about 2500-4700 nanometers wavelength region. The optical ele-
(Continued)

ment may comprise multiple layers of varying thicknesses to further tune the optical element to one or more spectral bands. Such an optical element may be utilized in a formation fluid analysis tool or an eye protection device.

20 Claims, 4 Drawing Sheets

(51) Int. Cl.
    *G01J 3/12*     (2006.01)
    *G02B 5/20*     (2006.01)
    *G02B 5/22*     (2006.01)

(52) U.S. Cl.
    CPC ... *E21B 49/0875* (2020.05); *G01J 2003/1213* (2013.01); *G01N 2201/0686* (2013.01)

(58) Field of Classification Search
    USPC .......................................................... 356/432
    See application file for complete search history.

(56) References Cited

U.S. PATENT DOCUMENTS

| | | | |
|---|---|---|---|
| 2012/0043658 A1* | 2/2012 | Collins | H01L 21/2855 |
| | | | 257/E23.161 |
| 2017/0071792 A1* | 3/2017 | Wilson | A61F 9/029 |
| 2017/0284931 A1 | 10/2017 | Perkins et al. | |

OTHER PUBLICATIONS

Thermadam, S. Puthen, et al. "Influence of Cu diffusion conditions on the switching of Cu—SiO2-based resistive memory devices." Thin Solid Films 518.12 (2010): 3293-3298.

Cruz, Rosenira S. da, et al. "Copper containing silicates as catalysts for liquid phase cyclohexane oxidation." Journal of the Brazilian Chemical Society 13.2 (2002): 170-176.

Rodriguez, Oscar R., et al. "Study of Cu diffusion in porous dielectrics using secondary-ion-mass spectrometry." Journal of applied physics 98.12 (2005): 123514.

Wang, Chen-Jui, and Shyankay Jou. "Study of copper-doped SiO2 films prepared by co-sputtering of copper and SiO2." Journal of Physics and Chemistry of Solids 69.2-3 (2008): 523-526.

International Search Report and Written Opinion issued in related PCT Application No. PCT/US2018/042728 mailed Apr. 9, 2019, 15 pages.

Atalay, S., H. I. Adiguzel, and F. Atalay. "Infrared absorption study of Fe2O3—CaO—SiO2 glass ceramics." Materials Science and Engineering: A 304 (2001): 796-799.

Li, Jian et al., "An Adaptable Optical Sensor for Chemometric Analysis" presented in Session 02-1 of the ISE 63rd Analysis Division Symposium (2018), Galveston, Texas, 15 pages.

International Preliminary Report on Patentability issued in related PCT Application No. PCT/US2018/042728 mailed Jan. 28, 2021, 12 pages.

\* cited by examiner

EXTRAORDINARY IR-ABSORPTION IN SiO₂ THIN FILMS WITH A FOREIGN OR ATTENUATING MATERIAL APPLIED

CROSS-REFERENCE TO RELATED APPLICATION

The present application is a U.S. National Stage Application of International Application No. PCT/US2018/042728 filed Jul. 18, 2018, which is incorporated herein by reference in its entirety for all purposes.

TECHNICAL FIELD OF THE INVENTION

This disclosure generally relates to tools for characterizing fluids by analysis of light-fluid interaction. In particular, this disclosure relates to a fluid analysis tool that includes thin film layers of silicon dioxide containing a foreign or attenuating material, such as copper or foreign or attenuating materials containing copper, for tuning the absorption property in a spectral region.

BACKGROUND

When performing subterranean operations in wellbores, it is often desirable to obtain information about the subterranean formation, including information regarding the fluids present in the formation. For example, accurate compositional measurements of reservoir fluid are necessary for various hydrocarbon exploration and production activities, such as ensuring that a well is drilled safely, identifying new discoveries, evaluating the production potential and value of new discoveries, optimizing the capital investment for production, and designing a field management system across multiple wells. During sampling and testing of the formation, for instance, formation fluid may be passed by a formation fluid analysis tool that includes a multivariate optical computing tool incorporated on a wireline formation tester, such as an integrated computational element (ICE) or an ICE Core® provided by Halliburton. An optical source may be configured to direct its light at the formation fluid such that the light is the directed toward the formation fluid analysis tool. The data collected by the formation fluid analysis tool may be analyzed for estimation of fluid properties such as fluid composition, density, or viscosity. However, accuracy of detection of fluid properties is limited as the films generally used in formation fluid analysis tools have limitations on absorption at certain wavelengths, for example, at or about a 3000 nanometer (nm) wavelength. To overcome the limitations on absorption, a formation fluid analysis tool may include films with several layers which not only increases costs but also have accuracy issues as such films are susceptible to drift.

BRIEF DESCRIPTION OF THE DRAWINGS

These drawings illustrate certain aspects of certain embodiments of the present disclosure. They should not be used to limit or define the disclosure.

Figure 1:
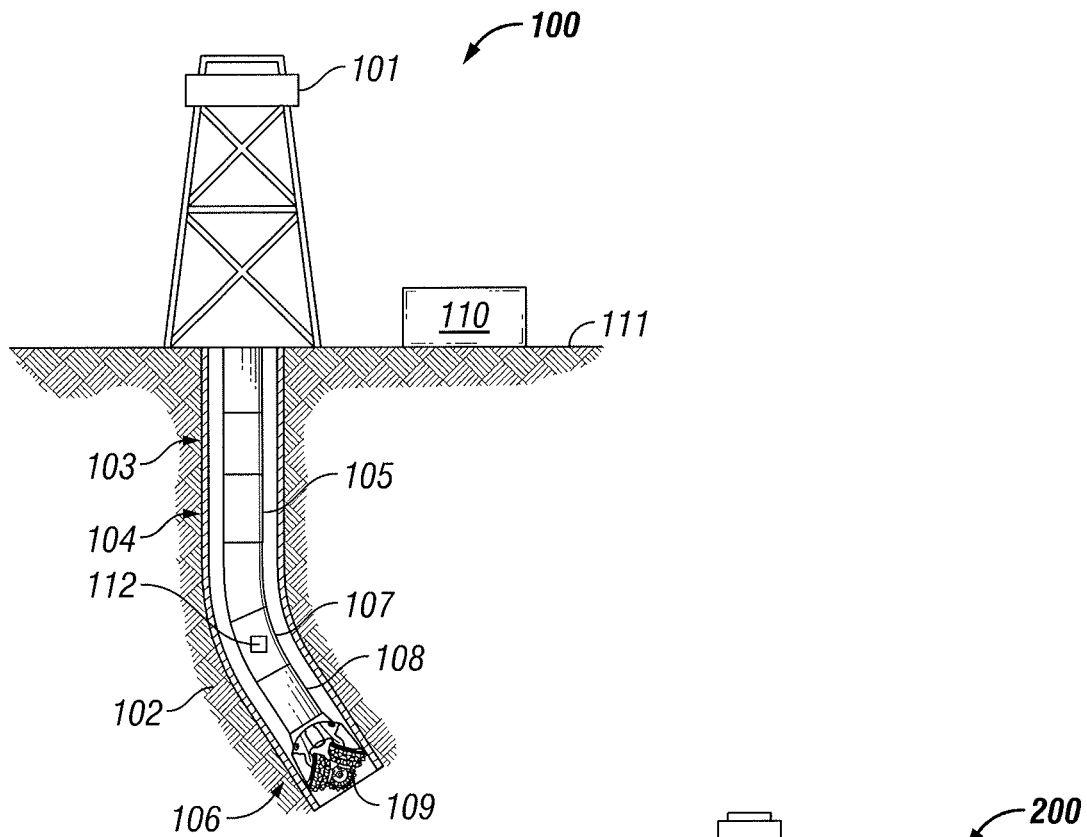
FIG. 1 illustrates an example downhole drilling system, in accordance with one or more aspects of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Formation fluid analysis tools or tools that include multivariate optical computing (MOC) may be used in downhole drilling systems to determine one or more characteristics of formation fluids (for example, fluid composition, density, or viscosity). This may be performed using spectral information associated with the formation fluids collected by the formation fluid analysis tools. For example, MOC is a compressed sensing technique that provides compositional analysis in a highly interfering complex mixture. The analysis occurs with the simplicity and robustness of a two-channel filter photometer, yet it provides the quality of a multivariate partial least squares (PLS) regression as if the data were acquired with a high-resolution laboratory optical spectrometer. During analysis, the data collected by the formation fluid analysis tool may be restricted to a particular range of wavelengths to increase the accuracy, sensitivity or both of the formation fluid analysis tool. This may be done by filtering out unwanted spectral contributions from the optical source using optical filters such as band pass filters introduced into the path between the formation fluid and an optical thin film, such as an integrated computational element (ICE) (ICE Core® provided by Halliburton), of the formation fluid analysis tool (for example, light reflected from or passing through the formation fluid first passes through an optical filter before being passed through the optical thin film of the formation fluid analysis tool). For example, from high-resolution transmission data, a regression vector is designed and encoded into a solid state multivariate optical element (MOE), for example, as a thin film interference transmission pattern. Therefore, as spectral light from a sample passes through the MOE and onto a detector, the mathematical dot product computation of a multivariate regression automatically provides the analyte composition as directed detector voltage analog output. Typically, multiple layers of one or more thin films or one or more thin films with a glass substrate are used in such formation fluid analysis or MOC tools with the layers tuned to form a spectral pattern. One or more aspects of the present disclosure provide the required sensitivity to analyze specified or desired fluids, such as formation fluids.

Accordingly, the present disclosure provides an extraordinary optical absorption band around the infrared (IR) wavelength region of at or about 2500-4700 nanometers or any range therebetween for an optical element or a MOE of a formation fluid analysis or MOC tool that comprises a substrate with a film according to one or more aspects of the present disclosure. For example, an optical element of a formation fluid analysis tool according to the present disclosure may include one or more thin film layers or one or more thin film layers deposited on a substrate where the one or more thin film layers comprise a silicon dioxide ($SiO_2$) material and a foreign or attenuating material or a dopant. The overall function of the foreign or attenuating material or dopant is to generate extra absorption in a spectral region where the spectral region comprises one or more wavelengths in a range of 2500 nanometers to 4700 nanometers. The thin film is fabricated with the foreign or attenuating material using one or more processes including, but not limited to, doping, infusing, implanting, evaporating, sputtering, diffusing or any other process for fabricating the thin film to include the foreign or attenuating material. Such a thin film fabricated with silicon dioxide and, for example, a copper material or a foreign or attenuating material including copper using any one or more processes will be referred to herein generally as an $SiO_2$:Cu thin film or a silicon dioxide doped with copper thin film. While a copper material or a foreign or attenuating material including copper is discussed herein, the present disclosure contemplates use of any foreign or attenuating material or dopant. For example, in one or more embodiments, the foreign or attenuating material may comprise or include one or more transition metals or one or more materials containing transition metal materials or transition metal derivatives, any one or more of copper (Cu), aluminum, titanium, zinc, silver, silicon, mercury, any other suitable dopant or any combination thereof. Transition metals and transmission elements are used interchangeably herein. A transition metal or element as used herein relates to an element whose atom has an incomplete d sub-shell, or which can give rise to cations with an incomplete d sub-shell as defined by the International Union of Pure and Applied Chemistry (IUPAC). In one or more embodiments, absorption of an $SiO_2$:Cu thin film may be selectively tuned or tailored for absorption down to at or about 2500 to 4700 nanometers or any region or wavelength in between. Thus, according to one or more aspects of the present disclosure, flexibility of design of a formation fluid analysis tool is provided such that an optical element, MOE, optical filter or ICE may be fabricated for accuracy and sensitivity of a specific spectral region. Any one or more aspects of the present disclosure provide better performance, sensitivity, accuracy, and flexibility for detection of a fluid using an optical element while also lowering costs as only a single layer or fewer layers are required. Throughout this disclosure, a silicon dioxide ($SiO_2$) material and a copper (Cu) material or a foreign or attenuating material including copper may be referred to as $SiO_2$ and Cu, respectively.

To facilitate a better understanding of the present disclosure, the following examples of certain embodiments are given. In no way should the examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. While one or more embodiments discussed herein are directed to hydrocarbon operations, productions, exploration or services, the present disclosure contemplates any one or more applications requiring optical devices and where optical absorption in the infrared region is required, for example, in eye protection devices such as eye glasses or eye protection devices. Embodiments described below with respect to one implementation are not intended to be limiting. Embodiments of the present disclosure and its advantages are best understood by referring to FIGS. 1 through 8, where like numbers are used to indicate like and corresponding parts.

In one or more aspects of the present disclosure, an operation at a site may utilize an information handling system to control one or more operations including, but not limited to, a motor or powertrain, one or more valves, one or more disconnects, one or more transducers, a wellhead, a downstream pressurized fluid system, or any combination thereof. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory, as well as communications media such wires, optical fibers, microwaves, radio waves, and other electromagnetic and/or optical carriers, and/or any combination of the foregoing.

FIG. 1 illustrates an example downhole drilling system 100, in accordance with one or more aspects of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device, and may communicate with elements of the BHA 106 (for example, a formation fluid analysis tool 112 in the LWD/MWD apparatus 107 according to one or more aspects of the present disclosure). The control unit 110 may receive data from and send control signals to the BHA 106 or components thereof. Additionally, in some embodiments, at least one processor and memory device may be located downhole within the BHA 106 for the same purposes. The LWD/MWD apparatus 107 may log the formation 102 (for example, sample, test, otherwise obtain information or any combination thereof about the formation) both while the wellbore 103 is being drilled, and after the wellbore is drilled to provide information regarding ongoing subterranean operations.

Modifications, additions, or omissions may be made to FIG. 1 without departing from the scope of the present disclosure. For example, formation fluid analysis tool 112 in accordance with the present disclosure may be located in steering assembly 108, drill bit 109 in addition to, or instead of, in LWD/MWD apparatus 107, or any combination thereof as described above. As another example, components may be added to downhole drilling system 100 or removed from downhole drilling system 100 without departing from the scope of the present disclosure.

Figure 2:
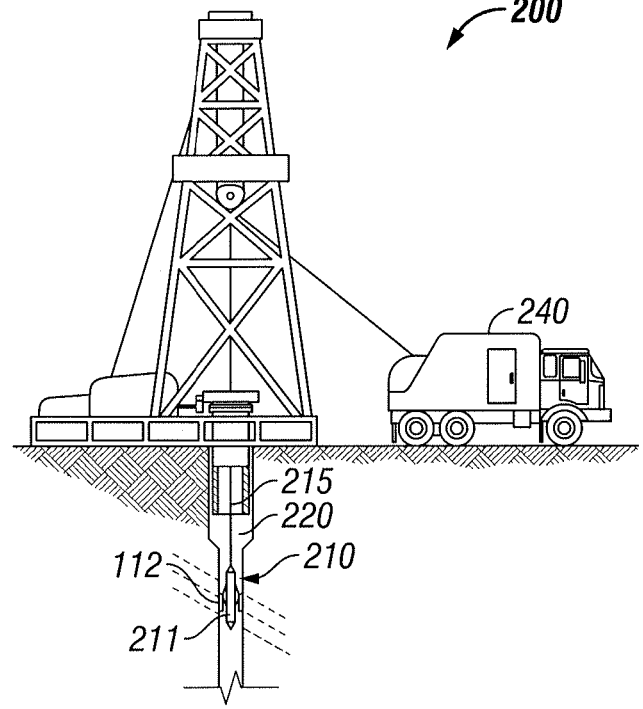
FIG. 2 illustrates an example downhole system with the drill string removed, in accordance with one or more aspects of the present disclosure.

FIG. 2 illustrates an example downhole logging system 200 with the drill string removed, in accordance with one or more aspects of the present disclosure. At various times after the drilling is completed, drill string 105 of FIG. 1 may be removed from wellbore 103 and a formation fluid analysis tool may be used to log information (for example, sample, test, and/or otherwise obtain information) about fluids in the subterranean formation. Subterranean operations such as logging may be conducted using wireline system 210 once the drill string has been completely removed. Wireline system 210 may include one or more logging tools 211 attached to a tool string that may be suspended into wellbore 220 by conveyance 215 (for example, a cable, slickline, coiled tubing, or the like). Logging tool 211 may comprise one or more formation fluid analysis tools 112 installed thereon, in particular embodiments. Logging tool 211 may be communicatively coupled to conveyance 215. Conveyance 215 may contain conductors for transporting power to wireline system 210 and telemetry from logging tool 211 to logging facility 240. Alternatively, conveyance 215 may lack a conductor, as is often the case using slickline or coiled tubing, and wireline system 210 may contain a control unit similar to control unit 110, shown in FIG. 1, that contains memory, one or more batteries, and/or one or more processors for performing operations and storing measurements. Logging facility 240 (shown in FIG. 2 as a truck, although it may be any other structure) may collect measurements from logging tool 211, and may include computing facilities for controlling, processing, or storing the measurements gathered by logging tool 211. The computing facilities may be communicatively coupled to logging tool 211 by way of conveyance 215 and may operate similarly to control unit 110 as shown in FIG. 1.

Modifications, additions, or omissions may be made to FIG. 2 without departing from the scope of the present disclosure. For example, components may be added to downhole logging system 200 or removed from downhole logging system 200 without departing from the scope of the present disclosure.

Figure 3A:
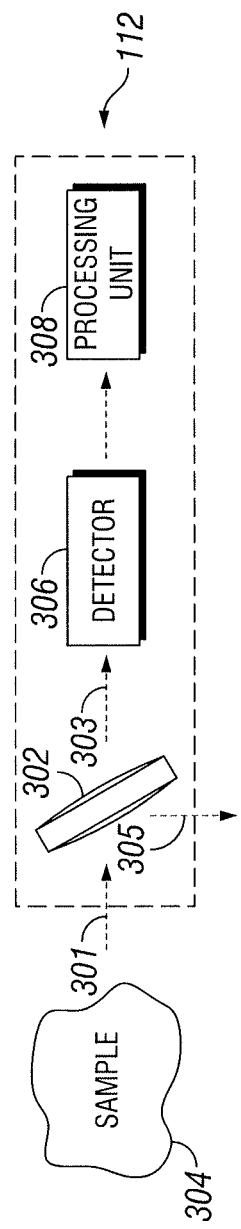
FIG. 3A illustrates a block diagram of an optical device, for example, a formation fluid analysis tool configured to determine one or more characteristics of a sample, in accordance with one or more aspects of the present disclosure.

FIG. 3A illustrates a block diagram of an optical device, for example, formation fluid analysis tool 112 configured to determine one or more characteristics or properties of a sample 304 in accordance with one or more aspects of the present disclosure. For example, the formation fluid analysis tool 112 may be used for MOC. As used herein, the term "characteristic" or "property" may refer to a chemical, mechanical or physical property of a fluid, substance or material. A characteristic of a sample 304 may include a quantitative value or a concentration of one or more chemical components therein. Example characteristics of a sample 304 that can be monitored with the formation fluid analysis tool 112 discussed herein may include, for example, formation fluid content (for example, oil, gas, brines or any combination thereof), pH, viscosity, or any other suitable fluid characteristic, or combinations thereof. Formation fluid analysis tool 112 may be used in one or more components of downhole drilling system 100, downhole logging system 200 or both as described above. Accordingly, formation fluid analysis tool 112 may be used to collect and analyze one or more characteristics of formation fluids in a drilling environment.

Formation fluid analysis tool 112 may include an optical element 302 configured to receive light 301 from, transmitted through, reflected from, or radiated from (or any combination thereof) a sample 304. In one or more embodiments, optical element 302 may comprise an MOE. The optical element 302 comprises a silicon dioxide thin film with a foreign or attenuating material applied, for example, an $SiO_2$:Cu thin film. Optical element 302 may be configured to detect a characteristic of sample 304 based on the received light 301. When light interacts with sample 304, unique physical and/or chemical information about sample 304 may be encoded in light 301 that is transmitted through, reflected from, or radiated from sample 304. Information associated with each different characteristic may be encoded in light 301. Light 301 may come from any number of sources. For example, light 301 may originate from heat emanating from sample 304. As another example, light 301 may be radiation emanating from or fluorescing from sample 304. In other embodiments, light 301 may be derived from an active source (for example, infrared, UV, or visible light) that illuminates sample 304. The source may be located within a portion of a drilling system (for example, drilling system 100) or a downhole logging system (for example, downhole logging system 200).

Sample 304 may be any type of downhole formation fluid that may have one or more characteristics that may be of interest. For example, in the context of drilling, sample 304 may include one or more liquids or gases in the wellbore. Accordingly, light 301 received from sample 304 may include information associated with any number of characteristics associated with sample 304. For example, light 301 may include information indicating formation fluid content (for example, oil, gas, and/or brines), pH, viscosity, or any other suitable fluid characteristic, or combinations thereof.

Optical element 302 may be configured to receive light 301 and detect a particular characteristic of sample 304 based on a correlation associated with the particular characteristic included in light 301. For example, optical element 302 may include one or more integrated computational elements (ICEs), such as ICE Core® provided by Halliburton and one or more filters, in particular embodiments.

There are a wide variety of implementations that may be employed to create optical element 302. In particular embodiments, optical element 302 may include one or more ICEs. ICEs of optical element 302 may comprise a plurality of alternating layers, for example, that include $SiO_2$:Cu, of optical elements with transmissive, reflective, and/or absorptive properties in the infrared (IR) region of at or about 2500-4700 nanometers wavelength or any range therebetween. The number of layers and the thickness of the layers, the thickness of the $SiO_2$:Cu or the $SiO_2$ with Cu applied may be determined or selected based at least in part on a characteristic of interest of a sample to be detected. For example, a thickness or number of layers may be constructed based on the spectral attributes of the characteristic of interest as determined from a spectroscopic analysis of the characteristic using a conventional spectroscopic instrument. In general, the combination of layers may correspond or may be related to the spectral correlation of the characteristic of interest.

The multiple layers may have different properties or refractive indices. By properly selecting the materials of the layers and their spacing, an ICE of optical element 302 can be made to selectively transmit, absorb, and/or reflect predetermined fractions of light at different wavelengths. Each wavelength may be given a pre-determined weighting or loading factor. The thicknesses and spacing of the layers may be determined using a variety of approximation methods from the spectrograph of the characteristic of interest. These methods may include solving Fresnel equations or performing inverse Fourier transforms (IFT) of the optical transmission spectrum and structuring the optical calculation device as the physical representation of the IFT. The approximations convert the IFT into a structure based on known materials with constant refractive indices. In addition to solids, in some embodiments, an ICE or MOE of optical element 302 may also contain liquids and/or gases in combination with solids to create the desired layers. An ICE of optical element 302 may also include holographic optical elements, gratings, and/or acousto-optic elements, for example, that may create the transmission, reflection, and/or absorption properties of interest for the layers of optical element 302.

The weightings that ICE or MOE of optical element 302 layers apply at each wavelength are set such that they relate or correlate to the regression weightings described with respect to a known equation, or data, or spectral correlation of the characteristic of interest. The intensity of transmitted, absorbed, or reflected light 303 is related to the amount (for example, concentration) of the characteristic of interest associated with sample 304. Accordingly, an ICE or MOE of optical element 302 may be configured or tuned to detect a particular characteristic of sample 304 based on the correlation associated with the particular characteristic that is included in received light 301.

The operation of an ICE or MOE is often illustrated in the optical transmission mode. However, it will be understood that an ICE of optical element 302 can operate as well in other optical modes, such as reflection, absorption, transflectance, Raman, Brillion, and Raleigh scattering modes, emittance or fluorescent modes, as well as evanescent modes.

In addition to an ICE or MOE, optical element 302 may include one or more optical filters configured to transmit only a portion of the spectral range of light 301. In one or more embodiments, the one or more optical filters of optical element 302 may comprise a plurality of alternating layers of varying thicknesses with transmissive, reflective, and/or absorptive properties suitable for detecting a characteristic of interest. In certain embodiments, the alternating layers that make up the optical filter of optical element 302 may be deposited on the same substrate as the ICE of optical element 302. That is, the one or more optical filters of optical element 302 may be fabricated upon the same substrate that the one or more ICEs of optical element are fabricated upon. In one or more embodiments, any one or more layers may include a silicon dioxide thin film with a foreign or attenuating material applied, for example, $SiO_2$:Cu, and any one or more layers may include any other material that generates the desired spectral pattern.

Formation fluid analysis tool 112 may also include a detector 306 optically coupled to the optical element 302. The detector 306 is configured to receive transmitted light 303 from optical element 302. Detector 306 may include any suitable apparatus, system, or device configured to detect the intensity of transmitted light 303 and generate a signal related to the intensity of transmitted light 303 received from optical element 302. For example, detector 306 may be configured to generate a voltage related to the intensity of transmitted light 303. Detector 306 may communicate the signal (for example, a voltage signal) related to the intensity of transmitted light 303 to a processing unit 308. Examples of detectors include split detectors, quad detectors, and array detectors.

Processing unit 308 may be configured to receive the signal communicated from detector 306 and correlate the received signal with the characteristic of which optical element 302 is configured to detect. For example, optical element 302 may be configured to detect temperature of sample 304, wherein the intensity of transmitted light 303 from optical element 302 may be related to the temperature of sample 304. Accordingly, detector 306 may generate a voltage signal based on the intensity of light 303 and may communicate the voltage signal to processing unit 308. Processing unit 308 may then correlate the received voltage signal with a temperature such that processing unit 308 may determine a temperature of sample 304.

Processing unit 308 may include a processor that is any system, device, or apparatus configured to interpret and/or execute program instructions and/or process data associated with formation fluid analysis tool 112. The processor may be, without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in one or more computer-readable media included in processing unit 308. Processor 308 may comprise an information handling system, for example, information handling system 500 of FIG. 5.

The computer-readable media may be communicatively coupled to the processor and may include any system, device, or apparatus configured to retain program instructions and/or data for a period of time (for example, computer-readable media). The computer-readable media may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to processing unit 308 is turned off. In accordance with some embodiments of the present disclosure, the computer-readable media may include instructions for determining one or more characteristics of sample 304 based on signals received from detector 306.

Optical element 302 may also be configured to reflect portions of light 301 not related to the characteristic of interest of a sample 304 as reflected electromagnetic radiation 305. In some embodiments, optical element 302 may reflect light 305 toward another detector (not expressly shown in FIG. 3A). The detector configured to receive reflected light 305 may be configured to generate a signal associated with reflected light 305 and communicate the signal to processing unit 308. Processing unit 308 may use the signal associated with light 305 to normalize the signal associated with transmitted light 303. In alternative embodiments, optical element 302 may be configured such that reflected light 305 may be related to the characteristic of interest and transmitted light 303 may be related to other characteristics of sample 304.

Formation fluid analysis tool 112 may be configured to detect and determine a characteristic of sample 304 based on light 301 received from sample 304. Formation fluid analysis tool 112 may include any number of optical elements 302 and associated detectors 306 configured to detect any number of characteristics of sample 304. Processing unit 308 may accordingly be configured to determine one or more properties of sample 304 based on the different characteristics detected by different optical elements 302 and associated detectors 306. Example characteristics that may be determined include formation fluid content (for example, oil, gas, and/or brines), pH, viscosity, density, salt content, opacity, combinations thereof, and the like. In many cases, the characteristics described above directly correlate to the signal of the formation fluid analysis tool and no further analysis is required to obtain the characteristic of interest. In some embodiments, processing unit 308 may be configured to store collected data associated with a detected characteristic in any suitable storage medium. The collected data may then be retrieved at a later time and may be analyzed and processed to determine various properties of sample 304. In embodiments where formation fluid analysis tool 112 is integrated with a drilling tool, processing unit 308 may be configured to communicate information associated with a detected characteristic to a well site using any suitable logging/measurement while drilling (LWD/MWD) communication system.

When monitoring more than one characteristic at a time, various configurations of optical elements 302 may be used. For example, formation fluid analysis tool may include multiple optical elements 302, where each optical element 302 has been configured to detect a particular characteristic, analyte of interest or both. In such embodiments, each optical element 302 may comprise a unique MOE, ICE or optical filter combination configured to detect the particular characteristic and/or analyte of interest.

Modifications, additions, or omissions may be made to FIG. 3A without departing from the scope of the present disclosure. For example, although illustrated as having one optical element 302, formation fluid analysis tool 112 may comprise any number of optical elements 302, each of which comprises any number of MOEs, ICEs, optical filters or any combination thereof. As another example, formation fluid analysis tool 112 may comprise any suitable number of detectors 306, including detectors for detecting light reflected by optical elements 302 (for example, light 303 and 305).

Figure 3B:
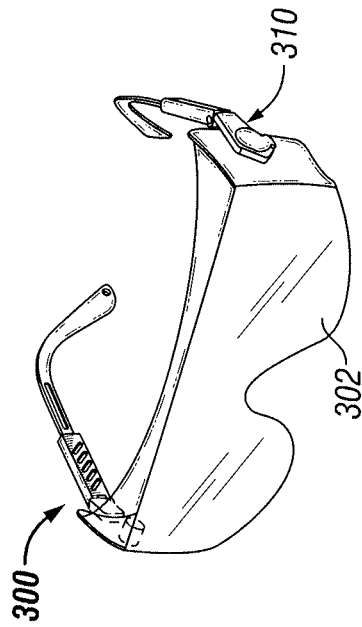
FIG. 3B illustrates an eye protection device as an example optical device, in accordance with one or more aspects of the present disclosure.

FIG. 3B illustrates an eye protection device 300 as an optical device, according to one or more aspects of the present disclosure. The eye protection device 300 comprises an eye protection or eye glass frame 310 for securing the eye protection detection about the eyes of a person, such as an operator or personnel. One or more optical elements 302 are coupled to or otherwise affixed to the eye protection frame 310. While FIG. 3B illustrates a single optical element 302 that spans the field of view of the eye protection frame 310, the present disclosure contemplates that any one or more optical elements 302 may be coupled to a frame 310 in any one or more configurations for eyewear devices. In one or more embodiments, optical element 302 of eye protection device 300 is tuned to block a specific band or region of light, for example, a band of light emitted by a particular laser. For example, the optical elements 302 may be tuned to an IR region of at or about 2500-4700 nanometers wavelength or any region or range in between.

Figure 4:
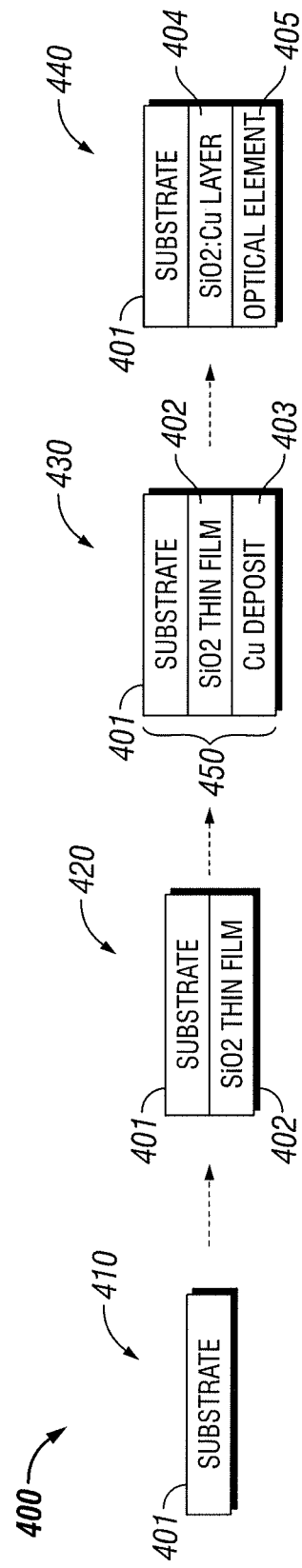
FIG. 4 illustrates an example method for fabricating an optical element of a formation fluid analysis tool that comprises an ICE and an optical filter fabricated on a substrate, in accordance with one or more aspects of the present disclosure.

FIG. 4 illustrates an example method 400 for fabricating an optical element, such as optical element 302 of FIG. 3A, of a formation fluid analysis tool, for example, formation fluid analysis tool 112, that comprises an optical element, MOE or ICE 404 (generally referred to as optical element 404) fabricated on a substrate 401, in accordance with one or more aspects of the present disclosure. The method 400 begins at step 410 with a substrate 401. Substrate 401 may be composed of any suitable material for use in fabricating optical elements, MOEs, ICEs or any other optical element thereon. As an example, substrate 401 may be composed of a borosilicate glass (for example, SCHOTT BK7). Other examples of substrate materials may include silicon or germanium. In particular embodiments, the material chosen for substrate 401 may depend on a wavelength range of interest (for example, the wavelength range of the MOE, optical element, ICE, or any combination thereof transmittance spectra region).

At step 420, the substrate 401 is coated with an $SiO_2$ thin film 402, an $SiO_2$ thin film 402 is deposited on the substrate 401 or $SiO_2$ thin film 402 is otherwise applied to the substrate 401. In one or more embodiments, the $SiO_2$ thin film may be formed independently of any substrate 401, for example, independently of substrate 401 of step 410. At step 430, a foreign or attenuating material, for example, Cu or a foreign or attenuating material including Cu, is introduced or applied to thin film 402. For example, when the $SiO_2$ thin film 402 is being deposited on the substrate 401, Cu material 403 is evaporated from another container and deposited into the $SiO_2$ thin film 402, known as co-deposition, forming a matrix of metal doped dielectric material that exhibits distinct features not existing in the pure dielectric phase. In one or more embodiments, the foreign or attenuating material (such as the Cu material) may be applied to the $SiO_2$ thin film 402 where applied includes, but is not limited to, any one or more of deposited, infused, doped, implanted, evaporated, sputtered, or diffused to form a layer, for example, a $SiO_2$:Cu layer. In one or more embodiments, a foreign or attenuating material, a foreign or attenuating material including Cu, a foreign or attenuating material comprising or including a transition metal, a Cu material or any combination thereof may be diffused from other thin film layers of the structure, the substrates, the parts that hold the MOE devices, or the ambient environment, without a separate foreign or attenuating material application step 430 or a separate foreign or attenuating material 403. The substrate 401, the $SiO_2$ thin film 402 and the foreign or attenuating material 403 form a layer 450. In one or more embodiments, optical element 400 comprises a plurality of layers 450. In one or more embodiments, each layer 450 may be the same thickness or any one or more layers 450 may be any one or more thicknesses. The thickness of any one or more layers 450 may be based on the thickness of the glass substrate 401, the SiO$_2$ thin film 402, the foreign or attenuating material 403 or any combination thereof. In one or more embodiments, the SiO$_2$ thin film including foreign or attenuating material 403 may be formed independently of any substrate 401.

At step 440 an optical element 405 is fabricated as part of or on the layer 404, for example, the SiO$_2$:Cu layer. Optical element 405 may be fabricated onto substrate 401 using any suitable method. For example, optical element 405. In one or more embodiments, any one or more other layers including any type of material including, but not limited to Si, SiO$_2$, Al$_2$O$_3$ and SiO$_2$:Cu, may be used in fabrication. The optical element 405 may be, for example, an integrated computational element (ICE), which may act as an optical interference filter based device that can be designed to operate over a continuum of wavelengths in the electromagnetic spectrum from the ultraviolet (UV) to mid-infrared (MIR) ranges, or any sub-set of that region. For the layer 404, the optical element 405 may be designed to operate over a continuum of wavelengths in the infrared (IR) range of at or about 2500-4700 nanometers. Electromagnetic radiation that optically interacts with the substance is changed and processed by the ICE so as to be readable by a detector, for example, detector 306 of FIG. 3A, such that an output of the detector can be correlated to the physical or chemical property of the substance being analyzed. An exemplary optical thin film based ICE typically includes a plurality of optical layers consisting of various materials whose index of refraction and size (for example, thickness) may vary between each layer. The design of an ICE refers to the number and thicknesses of the respective layers of the ICE. The layers may be strategically deposited and sized so as to selectively pass predetermined fractions of electromagnetic radiation at different wavelengths configured to substantially mimic a regression vector corresponding to a particular physical or chemical property of interest of a substance. Accordingly, an ICE design will exhibit a transmission function that is weighted with respect to wavelength. As a result, the output light from the ICE conveyed to the detector 306 may be related to the physical or chemical property of interest for the substance. The number and thickness of the various layers may determine one or more characteristics of the optical element 405, in particular embodiments, such as the spectral pattern that is transmitted through the optical element 405.

In one or more embodiments, a thickness of any one or more of a layer comprising a SiO$_2$ thin film with a foreign or attenuating material applied, for example, SiO$_2$ with a foreign or attenuating material (including but not limited to Cu or a foreign or attenuating material including Cu) applied may be at or about 30000 nanometers, 3000 nanometers, 4000 nanometers or any other suitable thickness for a given operation.

In one or more embodiments, any one or more steps discussed with respect to FIG. 4 may be implemented in any order and any one or more steps may be repeated or not implemented. For example, a foreign or attenuating material, such as Cu, may be introduced at any time during any step discussed with respect to FIG. 4 including before, during or after deposition of SiO$_2$ thin film 402.

Modifications, additions, or omissions may be made to method 400 without departing from the scope of the present disclosure. The order of the steps may be performed in a different manner than that described. Additionally, each individual step may include additional steps without departing from the scope of the present disclosure.

Figure 5:
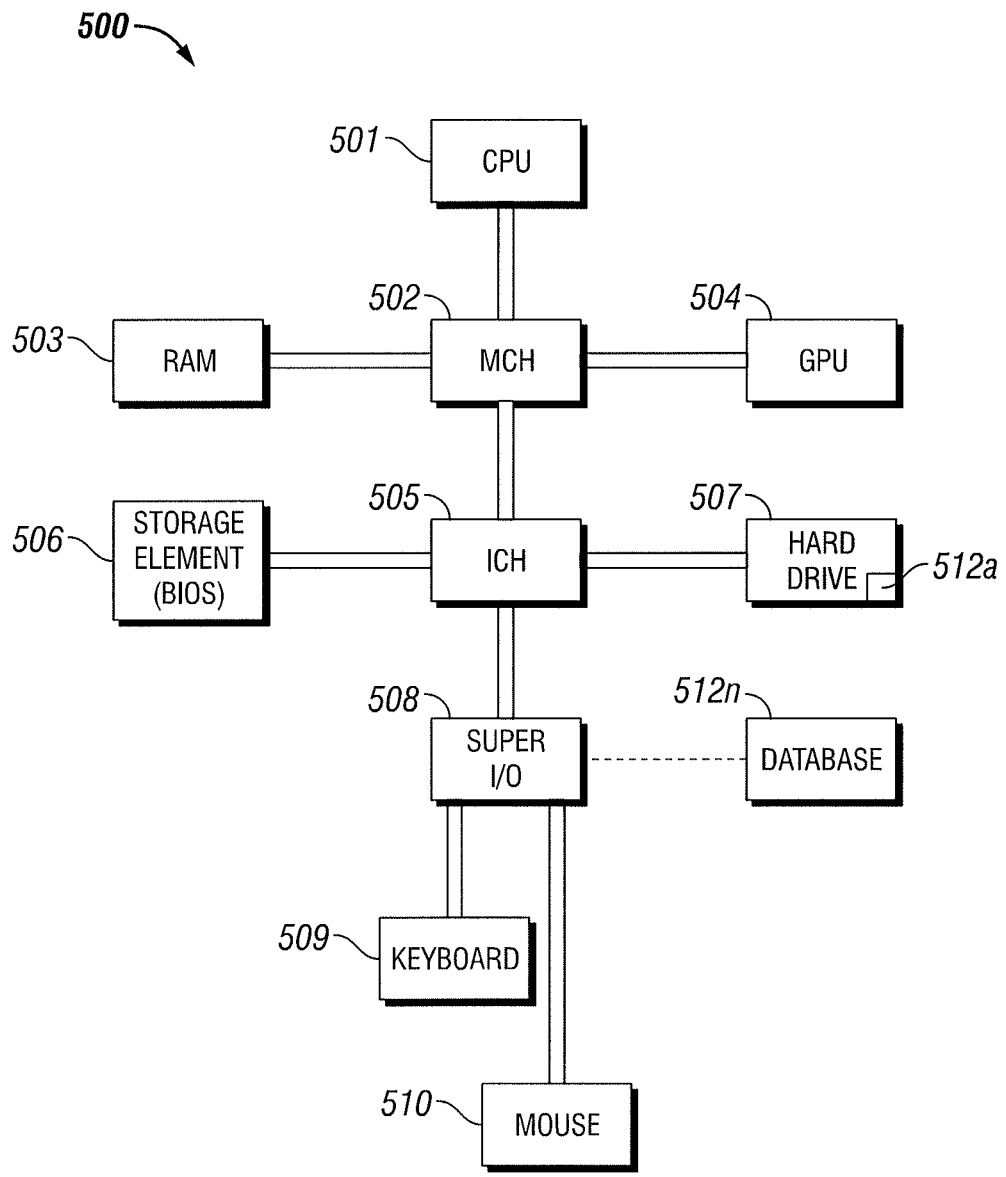
FIG. 5 is a diagram illustrating an example information handling system, in accordance with one or more aspects of the present disclosure.

FIG. 5 is a diagram illustrating an example information handling system 500, according to one or more aspects of the present disclosure. The master control system 102, control system 104 or both may take a form similar to the information handling system 500. A processor or central processing unit (CPU) 501 of the information handling system 500 is communicatively coupled to a memory controller hub or north bridge 502. The processor 501 may include, for example a microprocessor, microcontroller, digital signal processor (DSP), application specific integrated circuit (ASIC), or any other digital or analog circuitry configured to interpret and/or execute program instructions and/or process data. Processor 501 may be configured to interpret and/or execute program instructions or other data retrieved and stored in any memory such as memory 403 or hard drive 407. Program instructions or other data may constitute portions of a software or application for carrying out one or more methods described herein. Memory 403 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software program or an application may be retrieved and stored in memory 403 for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuit or components. For example, components of information handling system 500 may be implemented by configured computer program instructions.

Memory controller hub (MCH) 502 may include a memory controller for directing information to or from various system memory components within the information handling system 500, such as memory 503, storage element 506, and hard drive 507. The memory controller hub 502 may be coupled to memory 503 and a graphics processing unit 504. Memory controller hub 502 may also be coupled to an I/O controller hub (ICH) or south bridge 505. I/O hub 505 is coupled to storage elements of the information handling system 500, including a storage element 506, which may comprise a flash ROM that includes a basic input/output system (BIOS) of the computer system. I/O hub 505 is also coupled to the hard drive 507 of the information handling system 500. I/O hub 505 may also be coupled to a Super I/O chip 508, which is itself coupled to several of the I/O ports of the information handling system, including keyboard 509 and mouse 510. In one or more embodiments, one or more databases 512 may be accessible by or included within information handling system 500. Hard drive 507 may comprise a database 512a. Super I/O chip 508 may be communicatively coupled to a database 512n either directly or indirectly, wired or wirelessly. In one or more embodiments, database 512 may be internal (for example, as part of hard drive 507), external or both to information handling system 500.

Figure 6:
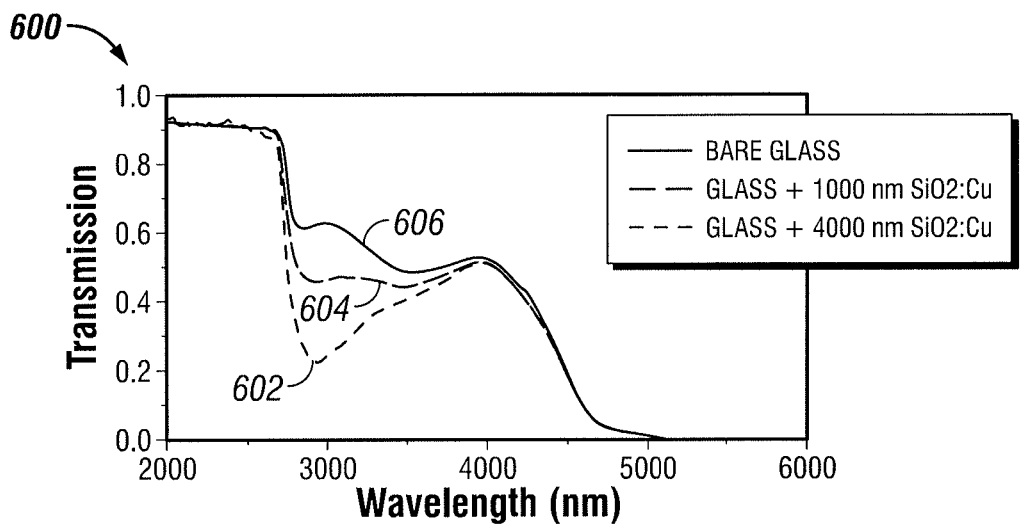
FIG. 6 illustrates an example graph of spectral transmission information for an optical element, in accordance with one or more aspects of the present disclosure.

FIG. 6 illustrates an example graph 600 of spectral transmission information for an optical element, according to one or more aspects of the present invention. Line 602 illustrates optical transmission of a glass substrate coated with at or about 4000 nanometer thickness of $SiO_2$:Cu film or thin film. Line 604 illustrates optical transmission of a glass substrate coated with at or about 1000 nanometer thickness of $SiO_2$:Cu film. Line 606 illustrates optical transmission of bare glass substrate. As illustrated in FIG. 6, one distinct and useful feature of glass substrate with $SiO_2$:Cu film, lines 602 and 604, is that the optical properties of $SiO_2$:Cu film, both refraction and absorption, are essentially identical to the glass substrate, line 606, except that the $SiO_2$:Cu film provides extra absorption in the range of 2500-4700 nanometers. That is, glass coated with $SiO_2$:Cu film looks the same as or substantially the same as glass except a lower transmission in the wavelength range of at or about 2500-4700 nanometers.

Figure 7:
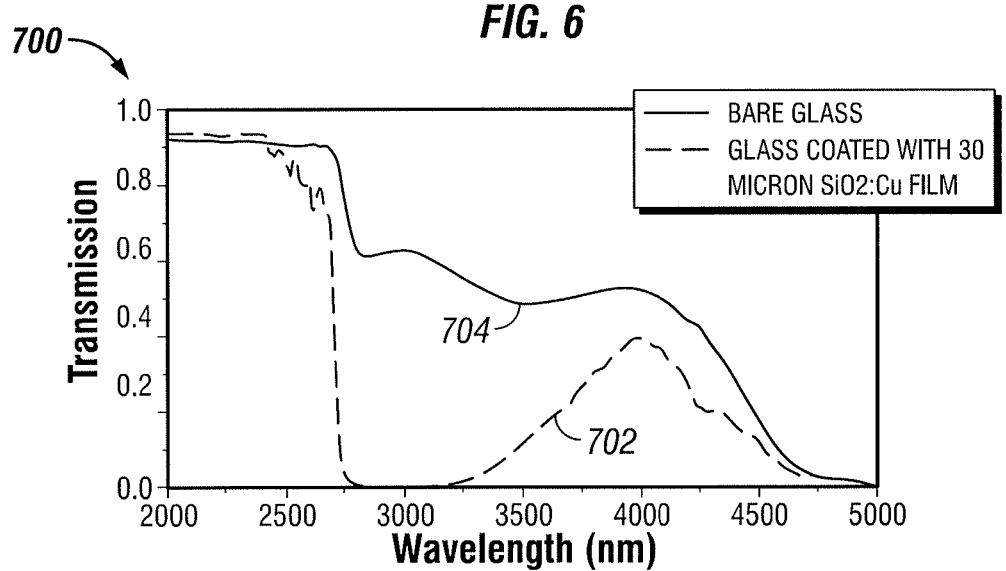
FIG. 7 illustrates an example graph of spectral transmission information for an optical element, in accordance with one or more aspects of the present disclosure.

FIG. 7 illustrates an example graph 700 of spectral transmission information for an optical element, according to one or more aspects of the present invention. In some applications, for example, eye protection against lasers, optical elements that resemble the look of glass in the visible range (at or about 400-800 nanometers wavelength) while blocking certain IR ranges are desired. Such eye protection is possible using glass substrate coated with $SiO_2$:Cu film or thin film without sacrificing the visible range transmission. Line 702 illustrates optical transmission of a glass substrate coated with at or about 30000 nanometers thickness of $SiO_2$:Cu film. A fully blocked (zero transmission) band of at or about 300 nanometers wide is formed and centered at 3000 nanometers but the transmission below at or about 2500 nanometers remains about the same as bare glass, represented by line 704.

Figure 8:
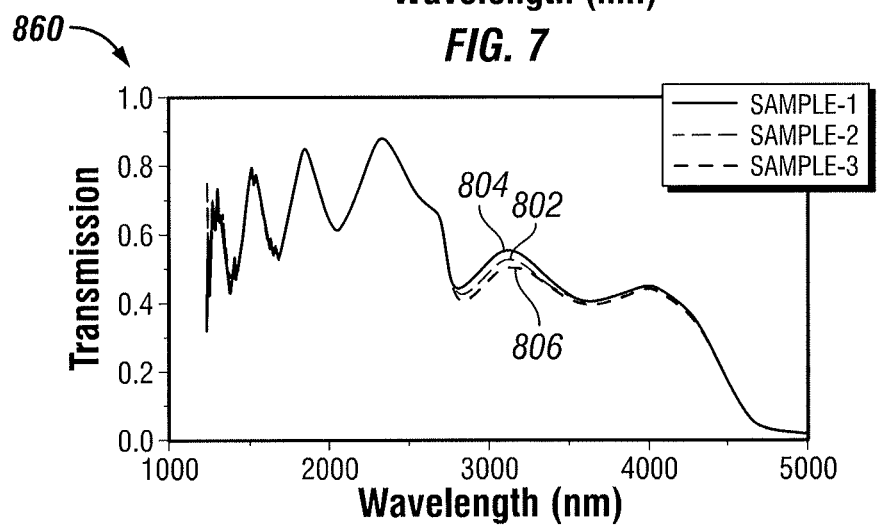
FIG. 8 illustrates an example graph of spectral transmission information for an optical element, in accordance with one or more aspects of the present disclosure.

FIG. 8 illustrates an example graph 800 of spectral transmission information for an optical element, according to one or more aspects of the present invention. As shown in FIGS. 6 and 8, the absolute amount of IR absorption can be tuned by adjusting the $SiO_2$:Cu film thickness. Additionally, the extra IR absorbing capability of $SiO_2$:Cu films or thin films with the same thickness can be tuned without changing the optical properties in other spectral regions. FIG. 8 illustrates the transmission spectra of three samples with multi-layers of Si and $SiO_2$ with the thickness of each close to each other but with different extra IR absorbing capabilities. Line 802 represents a first sample, line 804 represents a second sample and line 806 represents a third sample. As illustrated the transmissions of lines 802, 804 and 806 are substantially similar outside of the at or about 2500-4700 nanometers region but the extra IR absorptions differ noticeably. FIG. 8 illustrates that $SiO_2$:Cu film can be used as a normal component in optical devices such as in an ICE, in the less than 2500 nanometer spectral region and at the same time be used as an absorption tuner in the 2500-4700 nanometers region. The function of the $SiO_2$:Cu film in the two different regions can be achieved simultaneously.

To provide illustrations of one or more embodiments of the present disclosure, the following examples are provided.

In one or more embodiments, an optical device comprises an optical element comprising a layer, the layer comprising a silicon dioxide thin film and a foreign or attenuating material applied to the silicon dioxide thin film, wherein the layer is tuned for absorption at a spectral region, wherein the spectral region comprises a range of wavelengths of 2500 to 4700 nanometers. In one or more embodiments of the optical device, the optical device further comprises a detector of a formation fluid analysis tool for detecting light from the optical element. In one or more embodiments of the optical device, the optical device further comprises an eye protection frame, wherein the optical element is coupled to the eye protection frame. In one or more embodiments of the optical device, the foreign or attenuating material comprises at least one of one or more transition metals and one or more materials containing the one or more transition metals. In one or more embodiments of the optical device, one or more of the at least one of the one or more transition metals and one or more materials containing the one or more transition metals comprises copper or a material that includes copper. In one or more embodiments of the optical device, the attenuating material comprises at least one of aluminum, titanium, zinc, silver, silicon and mercury. In one or more embodiments of the optical device, the layer further comprises a substrate, and wherein the silicon dioxide thin film is deposited on the substrate. In one or more embodiments of the optical device, the layer further comprises a first layer of a first thickness and a second layer of a second thickness.

In one or more embodiments, a fluid analysis tool comprises an optical element comprising a layer, wherein the layer comprises a silicon dioxide thin film and a foreign or attenuating material applied to the silicon dioxide thin film, wherein the layer is tuned for absorption at a spectral region of 2500 to 4700 nanometers and a detector optically coupled to the optical element. In one or more embodiments of the fluid analysis tool, the optical element is tuned to detect one or more characteristics of a sample. In one or more embodiments of the fluid analysis tool, the foreign or attenuating material comprises at least one of one or more transition metals and one or more materials containing the one or more transition metals. In one or more embodiments of the fluid analysis tool, one or more of the one or more transition metals and the one or more materials containing the one or more transition metals comprises copper or a material that includes copper. In one or more embodiments of the fluid analysis tool, the attenuating material comprises at least one of aluminum, titanium, zinc, silver, silicon and mercury. In one or more embodiments of the fluid analysis tool, the layer further comprises a substrate, and wherein the silicon dioxide thin film is deposited on the substrate. In one or more embodiments of the fluid analysis tool, the layer further comprises a first layer of a first thickness and a second layer of a second thickness.

In one or more embodiments, a method of fabricating an optical device comprises applying a foreign or attenuating material to a silicon dioxide thin film, wherein the silicon dioxide thin film and the foreign or attenuating material form a layer that is tuned for absorption at a spectral region of 2500 to 4700 nanometers and fabricating an optical element as part of the layer. In one or more embodiments of the method of fabricating the optical device, applying the foreign or attenuating material comprises a process that includes at least one of doping, infusing, implanting, evaporating, sputtering or diffusing. In one or more embodiments of the method of fabricating the optical device, the method further comprises selecting a thickness of the layer based on a characteristic of interest of a sample. In one or more embodiments of the method of fabricating the optical device, the attenuating material comprises at least one of one or more transition metals and one or more materials containing the one or more transition metals. In one or more embodiments of the method of fabricating the optical device, one or more of the at least one of the one or more transition metals and the one or more materials containing the one or more transition metals comprises copper or a material that includes copper.

Illustrative embodiments of the present disclosure have been described herein. In the interest of clarity, not all features of an actual implementation may have been described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. An optical device, comprising:
   an optical element comprising a layer, the layer comprising:
   a silicon dioxide (SiO2) thin film; and
   an attenuating material comprising copper (Cu) and applied to the silicon dioxide thin film to form an SiO2:Cu layer, wherein the SiO2:Cu layer is tuned for absorption at an infrared (IR) wavelength spectral region, and wherein the IR wavelength spectral region comprises one or more wavelengths in a range of 2500 nanometers to 4700 nanometers.

2. The optical device of claim 1, further comprising a detector of a formation fluid analysis tool optically coupled to the optical element.

3. The optical device of claim 1, further comprising an eye protection frame coupled to the optical element.

4. The optical device of claim 1, wherein the attenuating material comprises at least one or more transition metals and one or more materials containing the one or more transition metals.

5. The optical device of claim 4, wherein one or more of the at least one or more transition metals and one or more materials containing the one or more transition metals comprises a material that includes the copper.

6. The optical device of claim 1, wherein the attenuating material further comprises at least one of aluminum, titanium, zinc, silver, silicon, or mercury.

7. The optical device of claim 1, wherein the layer further comprises a substrate, and wherein the silicon dioxide thin film is deposited on the substrate.

8. The optical device of claim 1, wherein the layer further comprises a first layer of a first thickness and a second layer of a second thickness.

9. A fluid analysis tool, comprising:
   an optical element comprising a layer, wherein the layer comprises:
   a silicon dioxide (SiO2) thin film; and
   an attenuating material comprising copper (Cu) and applied to the silicon dioxide thin film to form an SiO2:Cu layer, wherein the SiO2:Cu layer is tuned for absorption at an infrared (IR) wavelength spectral region, and wherein the IR wavelength spectral region comprises one or more wavelengths in a range of 2500 nanometers to 4700 nanometers; and
   a detector optically coupled to the optical element.

10. The fluid analysis tool of claim 9, wherein the optical element is tuned to detect one or more characteristics of a sample.

11. The fluid analysis tool of claim 9, wherein the attenuating material comprises at least one or more transition metals and one or more materials containing the one or more transition metals.

12. The fluid analysis tool of claim 11, wherein one or more of the at least one or more transition metals and one or more materials containing the one or more transition metals comprises a material that includes the copper.

13. The fluid analysis tool of claim 9, wherein the attenuating material comprises aluminum, titanium, zinc, silver, silicon, or mercury.

14. The optical element of claim 9, wherein the layer further comprises a substrate, and wherein the silicon dioxide thin film is deposited on the substrate.

15. The fluid analysis tool of claim 9, wherein the layer further comprises a first layer of a first thickness and a second layer of a second thickness.

16. A method of fabricating an optical device, comprising:
    applying an attenuating material comprising copper (Cu) to a silicon dioxide (SiO2) thin film, wherein the silicon dioxide thin film and the attenuating material form an SiO2:Cu layer that is tuned for absorption at an infrared (IR) wavelength spectral region, wherein the IR wavelength spectral region comprises one or more wavelengths in a range of 2500 nanometers to 4700 nanometers; and
    fabricating an optical element as part of the layer.

17. The method of claim 16, wherein applying the attenuating material comprises a process that includes at least one of doping, infusing, implanting, evaporating, sputtering, or diffusing.

18. The method of claim 16, further comprising selecting a thickness of the layer based on a characteristic of interest of a sample.

19. The method of claim 16, wherein the attenuating material comprises at least one or more transition metals and one or more materials containing the one or more transition metals.

20. The method of claim 19, wherein one or more of the at least one or more transition metals and the one or more materials containing the one or more transition metals comprises a material that includes the copper.

* * * * *